United States Patent
Yoshikawa et al.

(10) Patent No.: US 12,006,997 B2
(45) Date of Patent: Jun. 11, 2024

(54) DAMPER DEVICE

(71) Applicants: AISIN CORPORATION, Aichi (JP); AISIN AW INDUSTRIES CO., LTD, Echizen (JP)

(72) Inventors: Takuya Yoshikawa, Echizen (JP); Tomonori Kinoshita, Echizen (JP); Akiyoshi Kato, Echizen (JP); Ryosuke Otsuka, Echizen (JP); Yoichi Oi, Kariya (JP); Yu Mizukami, Kariya (JP); Aki Ogawa, Echizen (JP)

(73) Assignees: AISIN CORPORATION, Aichi (JP); AISIN AW INDUSTRIES CO., LTD., Fukui (JP)

( * ) Notice: Subject to any disclaimer, the term of this patent is extended or adjusted under 35 U.S.C. 154(b) by 439 days.

(21) Appl. No.: 17/413,620

(22) PCT Filed: Dec. 26, 2019

(86) PCT No.: PCT/JP2019/051295
§ 371 (c)(1),
(2) Date: Jun. 14, 2021

(87) PCT Pub. No.: WO2020/138361
PCT Pub. Date: Jul. 2, 2020

(65) Prior Publication Data
US 2022/0042573 A1   Feb. 10, 2022

(30) Foreign Application Priority Data
Dec. 26, 2018   (JP) ................ 2018-242829

(51) Int. Cl.
*F16F 15/134*   (2006.01)
*F16D 3/12*   (2006.01)
(Continued)

(52) U.S. Cl.
CPC .......... *F16F 15/13469* (2013.01); *F16D 3/12* (2013.01); *F16F 15/13157* (2013.01);
(Continued)

(58) Field of Classification Search
CPC . F16F 15/13469; F16F 15/13157; F16D 3/12; B60K 6/46; B60Y 2200/92; B60Y 2400/48
(Continued)

(56) References Cited

U.S. PATENT DOCUMENTS

| 5,816,973 A | 10/1998 | Sudau et al. |
| 9,599,187 B2 | 3/2017 | Uehara et al. |

(Continued)

FOREIGN PATENT DOCUMENTS

| EP | 3 081 423 A1 | 10/2016 |
| JP | 3041771 B2 | 3/2000 |

(Continued)

OTHER PUBLICATIONS

Standler, B. "Technical Writing" Sep. 24, 1999, retrieved from the internet Jun. 2, 2013 at <URL:http://www.tbs0.com/tw.htm>. (Year: 1999).*

(Continued)

*Primary Examiner* — Greg Binda
(74) *Attorney, Agent, or Firm* — Sughrue Mion, PLLC

(57) ABSTRACT

A damper device including an input element to which a torque from an engine is transmitted; an output element; an elastic body to transmit torque between the input element and the output element; and rotary inertia mass damper having a mass body that rotates in accordance with a relative rotation of the input element and the output element. The output element is coupled to a rotor of an electric motor, which is coupled to an input shaft of a transmission. The rotary inertia mass damper includes a planetary gear mecha-
(Continued)

nism having a carrier that supports pinion gears, the carrier is a part of the input element, one of the sun gear and the ring gear is a part of the output element, and the other of the sun gear and the ring gear functions as the mass body.

20 Claims, 11 Drawing Sheets

(51) Int. Cl.
*F16F 15/131* (2006.01)
*B60K 6/46* (2007.10)

(52) U.S. Cl.
CPC ............. *B60K 6/46* (2013.01); *B60Y 2200/92* (2013.01); *B60Y 2400/48* (2013.01)

(58) Field of Classification Search
USPC ........................................ 464/68.1; 475/347
See application file for complete search history.

(56) References Cited

U.S. PATENT DOCUMENTS

| | | | | |
|---|---|---|---|---|
| 9,702,431 | B2* | 7/2017 | Kawazoe | ............ F16F 15/1392 |
| 10,663,030 | B2* | 5/2020 | Yanaze | ............. F16F 15/12353 |
| 2017/0261065 | A1* | 9/2017 | Yoshikawa | ....... F16F 15/12353 |
| 2018/0245663 | A1 | 8/2018 | Yoshikawa et al. | |

FOREIGN PATENT DOCUMENTS

| | | |
|---|---|---|
| JP | 2014-184923 A | 10/2014 |
| JP | 6301158 B2 | 3/2018 |
| WO | 2012/066680 A1 | 5/2012 |
| WO | 2016/104783 A1 | 6/2016 |
| WO | 2016/208767 A1 | 12/2016 |
| WO | 2018/079040 A1 | 5/2018 |

OTHER PUBLICATIONS

Westerhoff, Martin, "Hybrid Drives: This is How They Work" VISION Magazine, Nov. 7, 2018, retrieved from the internet Jan. 6, 2021 at <https://www.zf.com/site/magazine/articles_11968.html>. (Year: 2018).*

Aki Ogawa et al., "Fundamental study about torsional vibration suppression of rotational machinery by using inerter", Proceedings of Lectures at the General Meeting of the Japan Society of Mechanical Engineers Tokai Branch, vol. 2017. 66.

Aki Ogawa et al., "Theoretical Studies of Function of Planetary Gear Inerter on Torsional Vibration System of Rotating Machine Train", Transaction of the Society of Automotive Engineers of Japan, Sep. 2017, pp. 1073-1078, vol. 48, No. 5.

International Search Report of PCT/JP2019/051295 dated Mar. 10, 2020 [PCT/ISA/210].

Extended European Search Report dated Feb. 25, 2022 in European Application No. 19901966.2.

* cited by examiner

DAMPER DEVICE

CROSS REFERENCE TO RELATED APPLICATIONS

This application is a National Stage of International Application No. PCT/JP2019051295, filed Dec. 26, 2019, claiming priority to Japanese Patent Application No. JP2018-242829, filed Dec. 26, 2018, the entire contents of which are incorporated in their entirety.

TECHNICAL FIELD

The present disclosure relates to a damper device including an elastic body that transmits a torque between an input element and an output element, and a rotary inertia mass damper.

BACKGROUND ART

Conventionally, a flywheel device that includes an elastic member that transmits a torque between a primary flange (input element) and a boss portion (output element), and a rotary inertia mass damper having a ring gear fixed to the boss portion, a pinion gear supported by the primary flange such that the pinion gear is rotatable, and a sun gear that meshes with the pinion gear is known (for example, see Patent Document 1). In this flywheel device, the sun gear functions as a mass body that rotates in accordance with a relative rotation of the primary flange and the boss portion to apply an inertial torque to the boss portion. Further, it is known that a rotary inertia mass damper including a planetary gear mechanism has a function of distributing a moment of inertia of a mass body to an input side rotation element and an output side rotation element (for example, see Non-patent Documents 1 and 2). According to Non-patent Documents 1 and 2, for example, in a rotary inertia mass damper in which a ring gear functions as a mass body, a moment of inertia can be adjusted so that a moment of inertia of one of input side and output side rotation elements becomes larger than the total value of a moment of inertia of the ring gear and the pinion gear serving as inertial elements, and so that a moment of inertia of the other one of the input side and output side rotation elements is decreased.

RELATED ART DOCUMENTS

Patent Documents

Patent Document 1: Japanese Patent No. 3041771 (JP 3041771 B) (FIG. 19)

Non-patent Document 1: Aki Ogawa, Kazuhiko Adachi, "Fundamental Study About Torsional Vibration Suppression of Rotational Machinery by Using Inerter", Proceedings of Lectures at the General Meeting of the Japan Society of Mechanical Engineers Tokai Branch, Vol. 2017. 66

Non-patent Document 2: Aki Ogawa, Kazuhiko Adachi, "Theoretical Studies of Function of Planetary Gear Inerter on Torsional Vibration System of Rotating Machine Train", Transaction of the Society of Automotive Engineers of Japan, 2017, Vol. 48, No. 5, p. 1073-1078

SUMMARY OF THE DISCLOSURE

Problem to be Solved by Various Aspects of the Disclosure

By the way, when an output element of a damper device including a rotary inertia mass damper as described above is coupled to an input shaft of a transmission, depending on a coupling manner of the damper device and the transmission, there are cases in which a resonance (shaft resonance) of the input shaft of the transmission, etc. is generated in a relatively low rotation range (low frequency range). When the shaft resonance of the transmission occurs in the low rotation range in this way, if it is possible to suppress the shaft resonance from becoming apparent by the damper device including the rotary inertia mass damper, the design of the transmission does not need to be changed, which is advantageous in terms of cost. However, in Patent Document 1 and Non-patent Documents 1 and 2 described above, the shaft resonance of the transmission coupled to the damper device is not considered at all.

Therefore, it is an aspect of the present disclosure is to satisfactorily suppress the shaft resonance of a transmission from becoming apparent, with the damper device including the rotary inertia mass damper.

Means for Solving the Problem

The damper device of the present disclosure includes: an input element to which a torque from an engine is transmitted; an output element; an elastic body that transmits a torque between the input element and the output element; and a rotary inertia mass damper having a mass body that rotates in accordance with a relative rotation of the input element and the output element, in which the output element is coupled to a rotor of an electric motor, the rotor of the electric motor is coupled to an input shaft of a transmission, the rotary inertia mass damper includes a planetary gear mechanism having a sun gear, a ring gear, a plurality of pinion gears, and a carrier that supports the plurality of pinion gears, the carrier is a part of the input element, one of the sun gear and the ring gear is a part of the output element, and the other of the sun gear and the ring gear functions as the mass body.

In the damper device of the present disclosure, the output element is coupled to the rotor of the electric motor, and the input shaft of the transmission is coupled to rotor of the electric motor. When the electric motor is disposed between the damper device and the transmission in this way, in addition to the moment of inertia of the output element, the moment of inertia of the rotor is applied to the moment of inertia of the input shaft of the transmission and thus, the natural frequency of the input shaft of the transmission that rotates integrally with the output element and the rotor, that is, the frequency of the shaft resonance, becomes smaller. Based on this, the damper device of the present disclosure is configured such that a part of the input element functions as a carrier of the planetary gear mechanism (rotary inertia mass damper), and a part of the output element functions as the one of the sun gear and the ring gear. Thus, due to a characteristic of the rotary inertia mass damper including the planetary gear mechanism, while the moment of inertia larger than the total value of the moment of inertia of the plurality of pinion gears and the other of the sun gear and the ring gear serving as the mass body is applied to the carrier, that is, the input element, the moment of inertia of the one of the sun gear and the ring gear, that is, the output element can be decreased. As a result, it is possible to suppress an increase in the moment of inertia (total value) of the input shaft of the transmission that rotates integrally with the output element and the rotor of the electric motor, that is, it is possible to suppress a decrease in the frequency of shaft resonance. Further, in the damper device of the present disclosure, it is possible to transmit, from the rotary inertia mass damper to the output element, the vibration (inertial torque) having an opposite phase of the vibration transmitted from the elastic body to the output element, and the torque fluctuation resulting from the shaft resonance can be decreased with the vibration transmitted from the rotary inertia mass damper to the output element. Thus, with the damper device of the present disclosure, it is possible to satisfactorily suppress the shaft resonance of the transmission from being generated in a relatively low rotation range and becoming apparent.

DETAILED DESCRIPTION OF EMBODIMENTS

Next, embodiments for carrying out aspects of the present disclosure will be described with reference to the drawings.

Figure 1:
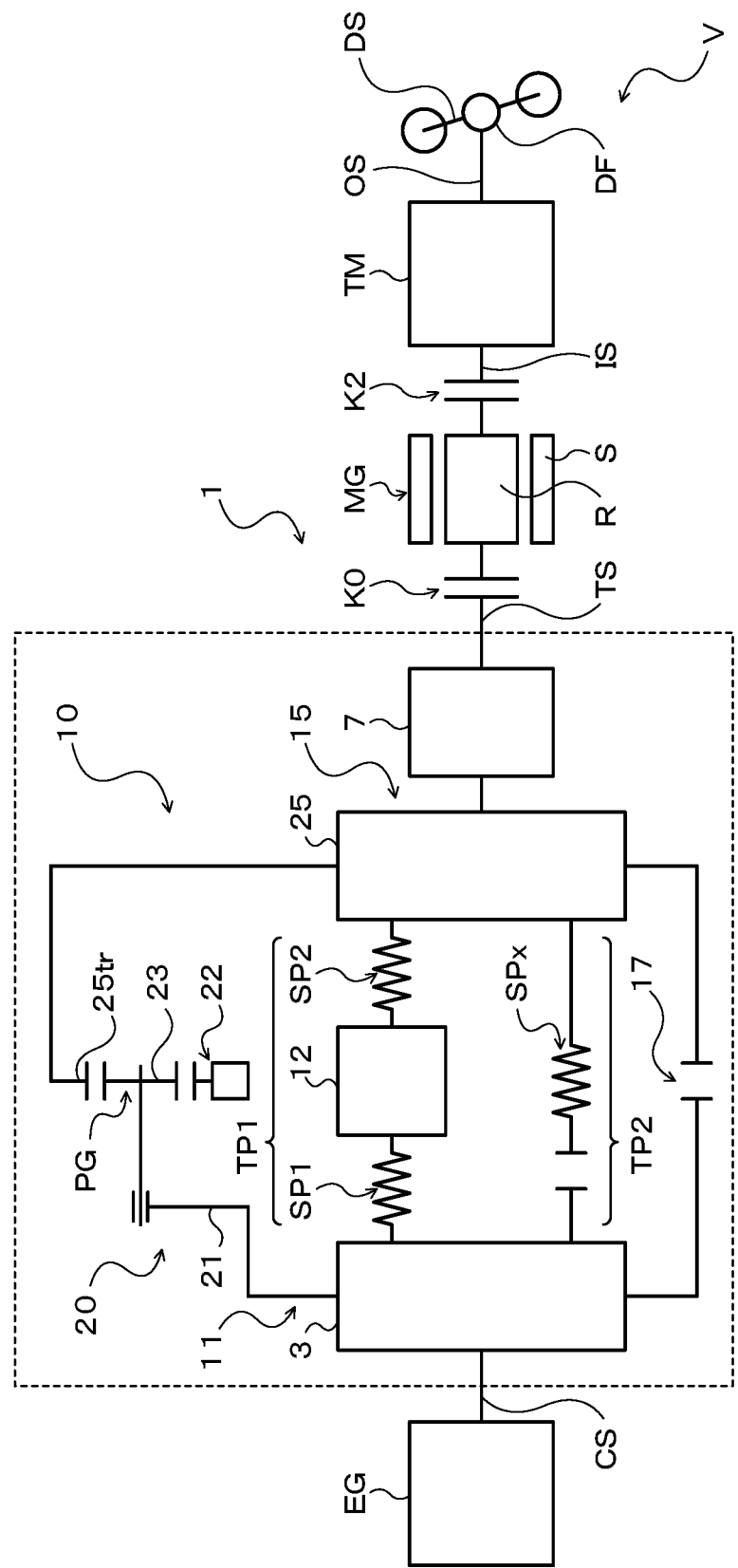
FIG. 1 is a schematic configuration diagram of a power transmission device including a damper device according to a first embodiment of the present disclosure.

FIG. 1 is a schematic configuration diagram showing a power transmission device 1 including a damper device 10 according to the first embodiment of the present disclosure. The power transmission device 1 shown in FIG. 1 is mounted on a vehicle V including an engine (internal combustion engine) EG that generates power by explosive combustion of a mixture of air and hydrocarbon fuel such as gasoline, light oil, and LPG. The power transmission device 1 can transmit power from the engine EG to a drive shaft DS. As shown in FIG. 1, in addition to the damper device 10 coupled to a crankshaft CS of the engine EG, the power transmission device 1 includes a motor generator MG, a transmission TM, a clutch K0 disposed between the damper device 10 and the motor generator MG, a clutch K2 disposed between the motor generator MG and the transmission TM, and a differential gear DF coupled to the transmission TM and the drive shaft DS.

The motor generator MG is a three-phase synchronous generator motor coupled to a battery (not shown) via an inverter (not shown). The motor generator MG includes a stator S, and a rotor R that is coupled to the damper device 10 via the clutch K0 and that is coupled to the transmission TM via the clutch K2. The motor generator MG can be driven by electric power from a battery to output a drive torque to the transmission TM, and can also output a regenerative braking torque to the transmission TM during braking of the vehicle V. Electric power generated by the motor generator MG with the output of a regenerative braking torque is used for charging the battery and driving an auxiliary machine (not shown).

The transmission TM is, for example, a 4-speed to 10-speed stepped transmission, and includes an input shaft (input member) IS that is coupled to the rotor R of the motor generator MG via the clutch K2, an intermediate shaft not shown that is coupled to the input shaft IS, an output shaft (output member) OS that is coupled to the differential gear DF via a gear mechanism not shown or that is directly coupled to the differential gear DF, at least one planetary gear mechanism for changing a power transmission path from the input shaft IS to the output shaft OS into a plurality of paths, a plurality of clutches and brakes (all not shown), and the like. However, the transmission TM may be, for example, a belt-type continuously variable transmission (CVT), a dual clutch transmission, or the like.

The clutch K0 is, for example, a multi-plate type hydraulic clutch, and couples a transmission shaft TS, which is coupled to the damper device 10, and the rotor R of the motor generator MG, and also releases the coupling of the transmission shaft TS and the rotor R. The clutch K2 is, for example, a multi-plate type hydraulic clutch that couples the rotor R of the motor generator MG and the input shaft IS of the transmission TM and that releases the coupling of the rotor R and the input shaft IS. However, the clutches K0 and K2 may be a single plate type hydraulic clutch, or may be a dry type clutch such as a dog clutch or an electromagnetic clutch.

In the power transmission device 1 of the present embodiment, the clutch K0 is released and the clutch K2 is engaged when the vehicle V starts. As a result, in a state in which the engine EG is stopped, a drive torque from the motor generator MG driven by electric power from the battery can be output to the drive shaft DS via the transmission TM, the differential gear DF, etc. so as to start the vehicle V. After the vehicle V is started, the engine EG is cranked and started by a starter motor (not shown) in accordance with the satisfaction of an engine starting condition. Further, when an engagement condition of the clutch K0 is satisfied, the clutch K0 is gradually engaged by slip control. As a result, a drive torque can be output from the engine EG to the drive shaft DS via the damper device 10, the transmission TM, the differential gear DF, and the like. In the power transmission device 1, in a state in which the clutch K2 is released and the clutch K0 is engaged, the battery can be charged by electric power from the motor generator MG that is driven by the engine EG to generate electricity.

Figure 2:
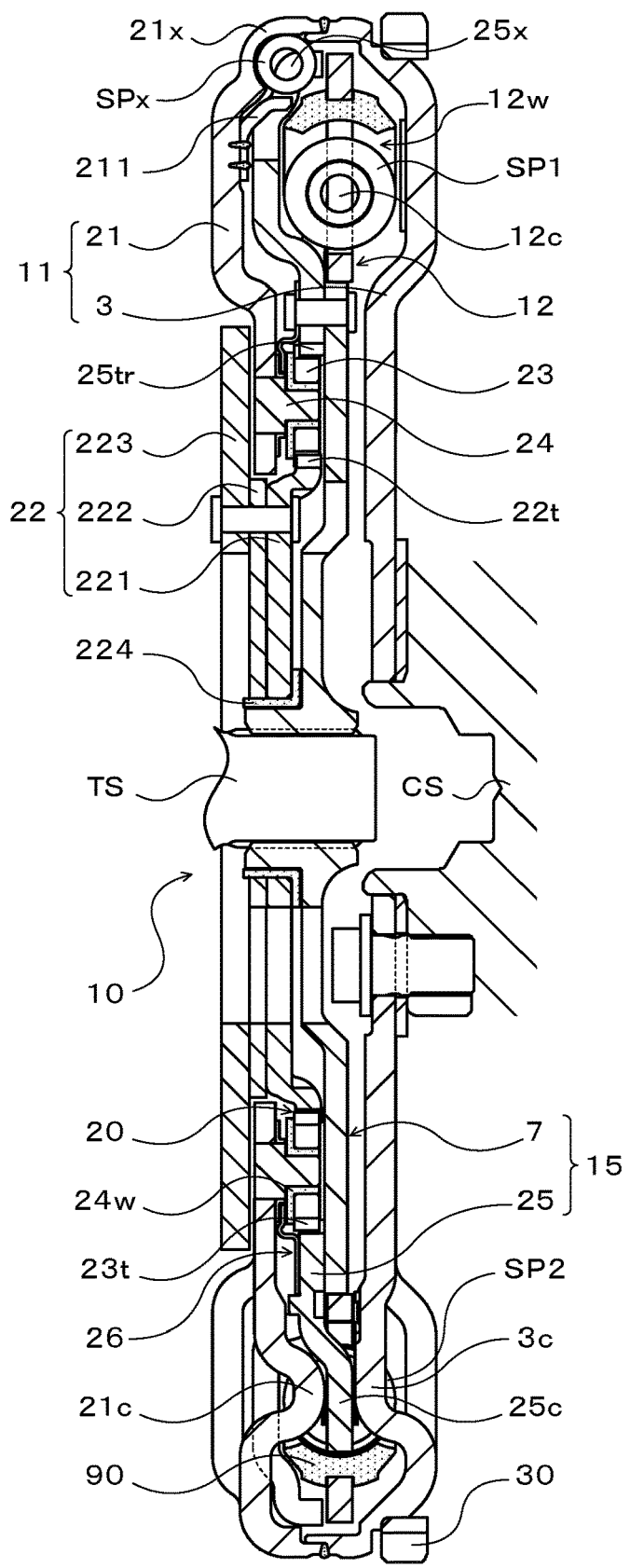
FIG. 2 is a cross-sectional view showing the damper device according to the first embodiment.

The damper device 10 is configured as a dry damper, and as shown in FIGS. 1 and 2, includes a drive plate (input element) 11, an intermediate member (intermediate element) 12, and a driven member (output element) 15, as rotation elements. Further, the damper device 10 includes, as torque transmission elements (torque transmission elastic bodies), a plurality of (for example, three in the present embodiment) first springs (input side elastic bodies) SP1 that transmits a torque between the drive member 11 and the intermediate member 12, a plurality of (for example, three in the present embodiment) second springs (output side elastic bodies) SP2 that acts in series on each corresponding first spring SP1 to transmit a torque between the intermediate member 12 and a driven member 15, and a plurality of (for example, three in the present embodiment) springs (second elastic bodies) SPx that can act in parallel and transmit a torque between the drive member 11 and the driven member 15.

In the following description, unless otherwise specified, an "axial direction" basically indicates an extending direction of a central axis (axial center) of the damper device 10. Unless otherwise specified, a "radial direction" is basically indicates the radial direction of the damper device 10 and a rotation element of the damper device 10 and the like, that is, the linear extending direction that extends from the central axis of the damper device 10 in a direction (radial direction) orthogonal to the central axis. Further, unless otherwise specified, a "circumferential direction" basically indicates a circumferential direction of the damper device 10 and the rotation element of the damper device 10, that is, a direction along a rotating direction of the rotation element.

As shown in FIG. 1, the plurality of first springs SP1, the intermediate member 12, and the plurality of second springs SP2 configure a first torque transmission path TP1 that transmits a torque between the drive member 11 and the driven member 15. In the present embodiment, coil springs having the same specifications (spring constants) as each other are adopted as the first and second springs SP1, SP2 of the first torque transmission path TP1. Further, the plurality of springs SPx configure a second torque transmission path TP2 for transmitting a torque between the drive member 11 and the driven member 15. As illustrated, the second torque transmission path TP2 is provided in parallel with the first torque transmission path TP1. The plurality of springs SPx of the second torque transmission path TP2 acts in parallel with the first and second springs SP1, SP2 of the first torque transmission path TP1, after an input torque to the drive member 11 reaches a predetermined torque (first threshold) T1 that is smaller than a torque T2 (second threshold) corresponding to a maximum torsion angle θmax of the damper device 10 and a torsion angle of the drive member 11 with respect to the driven member 15 becomes a predetermined angle θref or more. In this way, the damper device 10 has a two-step (two-stage) damping characteristic.

In the present embodiment, as the first and second springs SP1, SP2 and the springs SPx, a linear type coil spring made of a metal material spirally wound so as to have an axial center extending straight when no load is applied is adopted. As a result, the first and second springs SP1, SP2 and the springs SPx can be expanded and contracted more appropriately along the axial center, compared to the case in which an arc coil spring is used. As a result, it is possible to decrease the difference between a torque transmitted from the second spring SP2 or the like to the driven member 15 when the relative displacement between the drive member 11 (input element) and the driven member 15 (output element) increases, and a torque transmitted from the second spring SP2 or the like to the driven member 15 when the relative displacement between the drive member 11 and the driven member 15 decreases, that is, the hysteresis. However, an arc coil spring may be adopted as at least one of the first and second springs SP1, SP2 and the springs SPx.

As shown in FIG. 2, the drive member 11 of the damper device 10 includes a front cover 3 fixed to the crankshaft CS of the engine EG and a rear cover 21 integrated with the front cover 3. The front cover 3 is an annular member including an annular side wall portion and a short outer tubular portion extending in the axial direction from an outer periphery of the side wall portion. A plurality of bolt holes are provided on an inner peripheral portion of the front cover 3 (side wall portion), and the front cover 3 is fixed to the crankshaft CS via a plurality of bolts each inserted through a corresponding bolt hole and screwed to the crankshaft CS. Further, the front cover 3 includes a plurality of (for example, three in the present embodiment) torque transmitting and receiving portions (elastic body contact portions) 3c. The plurality of torque transmitting and receiving portions 3c protrude from an outer peripheral side region of the front cover 3 in the same direction (axial direction) as the outer tubular portion at intervals (at equal intervals) in the circumferential direction. Further, an external gear 30 that meshes with a pinion gear (not shown) attached to a rotation shaft of the starter motor described above is fixed to an outer peripheral portion of the front cover 3.

The rear cover 21 is an annular member including an annular side wall portion and a short outer tubular portion extending in the axial direction from an outer periphery of the side wall portion, and has an inner radius larger than an inner radius of the front cover 3 (side wall portion). The outer tubular portion of the rear cover 21 is joined to the outer tubular portion of the front cover 3 by welding and thus, the front cover 3 and the rear cover 21 are integrated so that the side wall portions face each other at an interval. Further, the rear cover 21 includes a plurality of (for example, three in the present embodiment) torque transmitting and receiving portions (elastic body contact portions) 21c. The plurality of torque transmitting and receiving portions 21c protrudes from an outer peripheral side region of the rear cover 21 in the same direction (axial direction) as the outer tubular portion at intervals (at equal intervals) in the circumferential direction, and each face the corresponding torque transmitting and receiving portion 3c of the front cover 3 at an interval in the axial direction.

Figure 3:
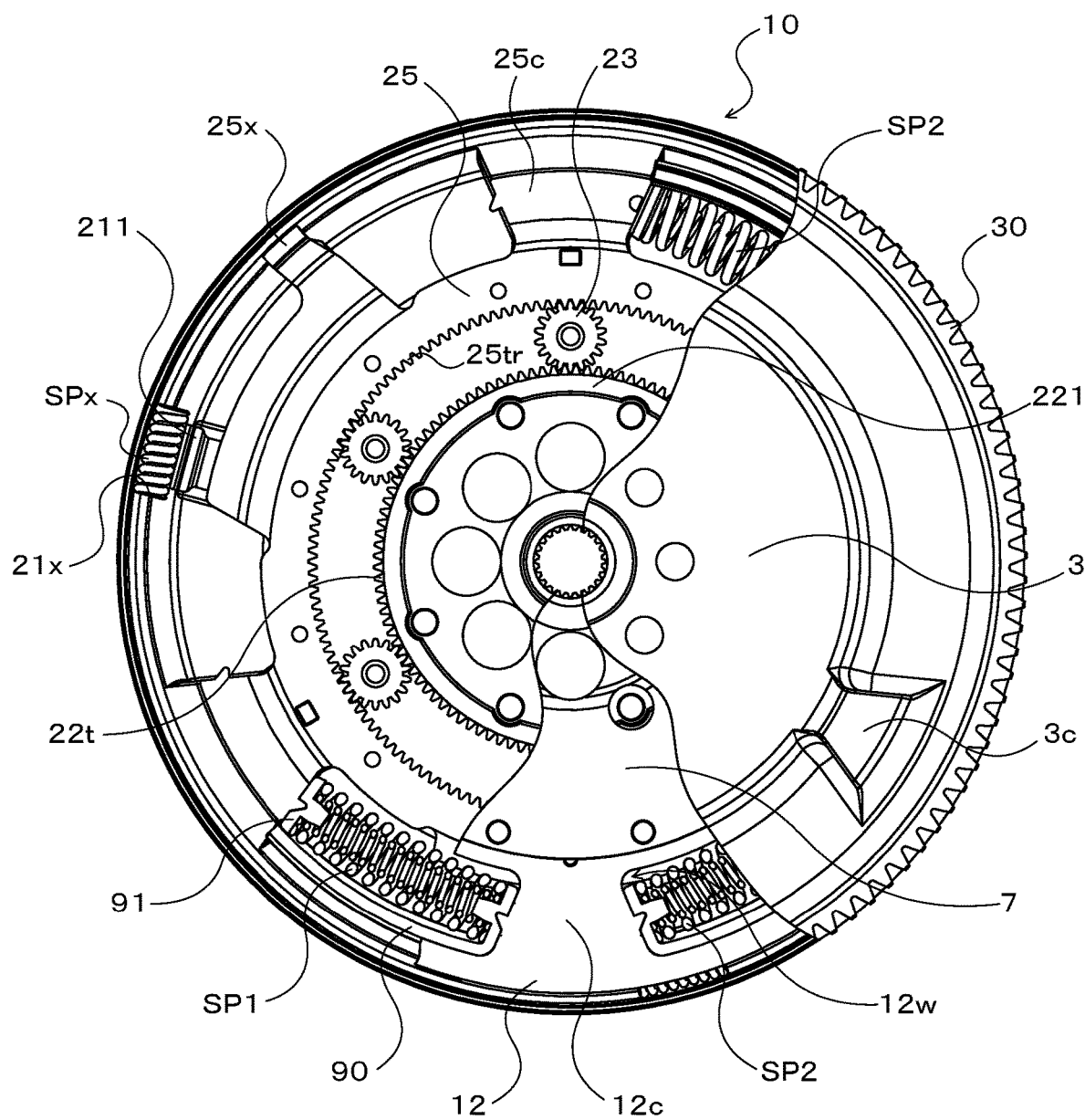
FIG. 3 is a front view showing the damper device according to the first embodiment.

Further, a plurality of (for example, three in the present embodiment) spring holding recess portions 21x is formed on an inner surface of a corner portion on the outer peripheral side of the rear cover 21 at intervals in the circumferential direction. Each spring holding recess portion 21x has a peripheral length corresponding to a natural length of the spring SPx, and holds the spring SPx from both sides as shown in FIG. 3. Further, a plurality of (for example, three in the present embodiment) spring supporting members 211 is fixed to the rear cover 21 by welding so as to be positioned radially inward of each corresponding spring holding recess portion 21x.

As shown in FIGS. 2 and 3, the intermediate member 12 is an annular member disposed in the outer peripheral side region inside the front cover 3 and the rear cover 21. The intermediate member 12 has a plurality of (for example, three in the present embodiment) spring housing windows 12w and a plurality of (for example, three in the present embodiment) torque transmitting and receiving portions (elastic body contact portions) 12c that are each extended in an arc shape and that are disposed at intervals (at equal intervals) in the circumferential direction. One torque transmitting and receiving portion 12c is provided between the spring housing windows 12w adjacent to each other along the circumferential direction.

The driven member 15 includes a damper hub 7 to which the transmission shaft TS described above is fixed, and a driven plate 25 integrated with the damper hub 7. The damper hub 7 is an annular member including an inner tubular portion to which the transmission shaft TS is spline-fitted (fixed) and an annular plate portion extending radially outward from the inner tubular portion. The outer peripheral side region of the plate portion of the damper hub 7 is disposed inside the front cover 3 and the rear cover 21, and an outer peripheral surface of the damper hub 7 is formed so as to rotatably support an inner peripheral surface of the intermediate member 12 (see FIG. 2). The driven plate 25 is an annular member having an inner radius smaller than an outer radius of the damper hub 7 and an outer radius larger than an outer radius of the damper hub 7. The driven plate 25 is disposed so as to be offset in the axial direction from the plate portion of the damper hub 7 toward the rear cover 21 side, and is fixed to the outer peripheral portion of the damper hub 7 (plate portion) via a plurality of rivets.

As shown in FIGS. 2 and 3, the driven plate 25 includes a plurality of (for example, three in the present embodiment) torque transmitting and receiving portions (elastic body contact portions) 25c and a plurality of (for example, three in the present embodiment) spring contact portions 25x. The plurality of torque transmitting and receiving portions 25c are formed so as to protrude radially outward from an inner peripheral portion of the driven plate 25 at intervals (at equal intervals) in the circumferential direction. As shown in FIG. 2, each torque transmitting and receiving portions 25c is offset in the axial direction from the inner peripheral portion of the driven plate 25 so that the torque transmitting and receiving portion 25c is positioned between the torque transmitting and receiving portions 3c of the front cover 3 and the torque transmitting and receiving portions 21c of the rear cover 21. The plurality of spring contact portions 25x is disposed so as to be arranged at intervals (at equal intervals) in the circumferential direction, and is each positioned on one side of the corresponding spring holding recess portion 21x of the rear cover 21 in the circumferential direction. Further, a plurality of internal teeth 25tr is formed on an inner periphery of the driven plate 25. As illustrated, the plurality of internal teeth 25tr may be formed on the entire inner circumference of the driven plate 25, and a plurality of internal teeth 25tr may be formed at set positions at intervals (at equal intervals) in the circumferential direction on the inner circumference of the driven plate 25.

In each spring housing window 12w of the intermediate member 12, one first spring SP1 and one second spring SP2 are each disposed so as to form a pair (act in series) with each other. As shown in FIG. 3, spring seats 90, 91 are attached to the first and second springs SP1, SP2 prior to disposition into the spring housing window 12w. The spring seat 90 is formed so as to be fitted to one end of the corresponding first or second springs SP1, SP2 and so as to cover a region on an outer radial side of an outer peripheral surface of the first or second springs SP1, SP2. Further, the spring seat 91 is fitted to the other end of the corresponding first or second springs SP1, SP2. The first and second springs SP1, SP2 to which the spring seats 90, 91 are mounted are disposed in the spring housing window 12w so that the spring seat 90 is in sliding contact with the inner wall surface of the intermediate member 12 forming the corresponding spring housing window 12w.

In a mounted state of the damper device 10, each of the torque transmitting and receiving portions 3c, 21c of the front cover 3 and the rear cover 21 configuring the drive member 11 is in contact with the spring seat 91 that is attached to the first and second springs SP1, SP2, which are disposed in the spring housing windows 12w different from each other and which do not form a pair (do not act in series), between the first and second springs SP1, SP2. Further, in the mounted state of the damper device 10, each torque transmitting and receiving portion 12c of the intermediate member 12 is in contact with an end portion of the spring seat 90 that is attached to the first and second springs SP1, SP2, which are disposed in a common spring housing window 12w and which form a pair with each other, between the first and second springs SP1, SP2. Further, in the mounted state of the damper device 10, each torque transmitting and receiving portion 25c of the driven plate 25 configuring the driven member 15 is in contact with the spring seat 91 that is attached to the first and second springs SP1, SP2, which are disposed in spring housing windows 12w different from each other and which do not form a pair (do not act in series), between the first and second springs SP1, SP2.

Thus, as shown in FIG. 3, the first and second springs SP1, SP2 are alternately arranged in the circumferential direction of the damper device 10, and the first and second springs SP1, SP2 that form a pair with each other are coupled in series via the torque transmitting and receiving portion 12c of the intermediate member 12, between the drive member 11 and the driven member 15. Therefore, in the damper device 10, rigidity of the elastic body that transmits a torque between the drive member 11 and the driven member 15, that is, a combined spring constant of the first and second springs SP1, SP2 can be made smaller. In the present embodiment, the first and second springs SP1, SP2, which are each plural, are arranged on the same circumference, and the distance between the axial center of the damper device 10 and the axial center of each first spring SP1 and the distance between the axial center of the damper device 10, etc. and the axial center of each second spring SP2 are the same, as shown in FIG. 3.

Further, the spring SPx is disposed in each spring holding recess portion 21x of the rear cover 21 of the drive member 11, and each spring SPx is supported from the inner radial side by the corresponding spring supporting member 211. As a result, the plurality of springs SPx is disposed outside the first and second springs SP1, SP2 in the radial direction of the damper device 10. In the mounted state of the damper device 10, one end portion of each spring SPx is in contact with a spring contact portion formed on one side of the corresponding spring holding recess portion 21x, and the other end portion of each spring SPx is in contact with a spring contact portion formed on the other side of the corresponding spring holding recess portion 21x, while being separated from the corresponding spring contact portion 25x of the driven plate 25 in the circumferential direction. Then, the other end portion of each spring SPx becomes in contact with the corresponding spring contact portion 25x of the driven plate 25 when an input torque (driving torque) to the drive member 11 or a torque (driven torque) applied from a vehicle shaft side to the driven member 15 reaches the torque T1 described above and a torsion angle of the drive member 11 with respect to the driven member 15 becomes equal to or more than the predetermined angle θref.

Further, the damper device 10 includes a stopper 17 that restricts a relative rotation between the drive member 11 and the driven member 15. When the input torque to the drive member 11 reaches the above-described torque T2 corresponding to the maximum torsion angle θmax of the damper device 10, the stopper 17 restricts a relative rotation between the drive member 11 and a driven plate 15, and all deflections of the first and second springs SP1, SP2 and the springs SPx are restricted accordingly.

Further, as shown in FIG. 1, the damper device 10 has a rotary inertia mass damper 20 that is provided in parallel with both the first torque transmission path TP1 including the plurality of first springs SP1, the intermediate member 12, and the plurality of second springs SP2, and the second torque transmission path TP2 including the plurality of springs SPx. As illustrated, the rotary inertia mass damper 20 includes a single pinion type planetary gear mechanism PG (see FIG. 1) disposed between the drive member 11 that is the input element of the damper device 10 and the driven member 15 that is the output element of the damper device 10. In the present embodiment, the planetary gear mechanism PG is configured of: a sun gear 22 that includes a plurality of external teeth 22t and that functions as a mass body (inertia mass body) of the rotary inertia mass damper 20; a plurality of (for example, six in the present embodiment) pinion gears 23 having a plurality of gear teeth 23t that each mesh with the external teeth 22t of the sun gear 22; the rear cover 21 of the drive member 11 that rotatably supports the plurality of pinion gears 23 and that functions as a carrier; and the driven plate 25 that includes the plurality of internal teeth 25tr, which mesh with the gear teeth 23t of the plurality of pinion gears 23, and that functions as a ring gear.

As shown in FIGS. 2 and 3, the sun gear 22 includes a gear member 221, a spacer 222 and an annular member 223 that are integrated via a plurality of rivets. The gear member 221 is an annular member including the plurality of external teeth 22t, and the plurality of external teeth 22t are offset in the axial direction with respect to an inner peripheral portion of the gear member 221 so as to be close to the damper hub 7 and be positioned radially inward of the driven plate 25 (internal teeth 25tr) serving as a ring gear. The spacer 222 is an annular member having an outer radius smaller than an inner radius of the rear cover 21 and an inner radius substantially the same as an inner radius of the gear member 221. The gear member 221 and the spacer 222 are rotatably supported by the outer peripheral surface of the inner tubular portion of the damper hub 7 via a washer 224 made of resin. As shown in FIG. 2, a plurality of work holes used when coupling the front cover 3 to the crankshaft CS with bolts is formed in the gear member 221, the spacer 222, and the damper hub 7.

The annular member 223 has an inner radius smaller than the inner radius of the rear cover 21 and an outer radius larger than the inner radius of the rear cover 21. The annular member 223 is disposed on an outer side of the rear cover 21 in the axial direction of the damper device 10 (left side in FIG. 2), and is coupled to the gear member 221 and the spacer 222 via a plurality of rivets on an inner radial side of an inner periphery of the rear cover 21. As shown in FIG. 2, a plurality of work holes used when coupling the gear member 221, the spacer 222, and the annular member 223 with a plurality of rivets is formed in the damper hub 7. Further, as shown in FIG. 2, the annular member 223 overlaps with a part of the rear cover 21 when viewed from the axial direction (left side in FIG. 2). By forming the sun gear 22 with such a gear member 221, a spacer 222, and an annular member 223, the moment of inertia of the sun gear 22 serving as a mass body can be further increased. However, the spacer 222 may be omitted, and a part corresponding to the spacer 222 may be formed on either the gear member 221 or the annular member 223.

The rear cover 21 serving as a carrier supports, in cantilever, one end (base end) of a plurality of pinion shafts 24 on an inner radial side of the plurality of torque transmitting and receiving portions 21c at intervals (at equal intervals) in the circumferential direction. That is, the base end (left end in FIG. 2) of each pinion shaft 24 is fixed to the inner peripheral portion of the rear cover 21 by press fitting, for example. Further, the other end (right end in FIG. 2) of each pinion shaft 24 protrudes inward of the front cover 3 and the rear cover 21 so as not be in contact with the damper hub 7, and supports the corresponding pinion gear 23 via a washer 24w made of resin so that the corresponding pinion gear 23 is rotatable. That is, the rear cover 21 supports the plurality of pinion shafts 24 with a part, to which an average torque is not transmitted, on an inner radial side of the plurality of torque transmitting and receiving portions 21c Further, the first and second springs SP1, SP2, the driven plate 25 serving as a ring gear, and the plurality of pinion gears 23 are surrounded by the drive member 11, that is, the front cover 3 and the rear cover 21 joined to each other.

Further, an annular grease holding member 26 is disposed around each pinion gear 23. The grease holding member 26 is formed so as to cover a meshing portion between each pinion gear 23 (gear teeth 23t) and the driven plate 25 (internal teeth 25tr) serving as a ring gear from an outer radial side, and the grease holding member 26 is fixed to the driven plate 25 and the damper hub 7 by the abovementioned plurality of rivets. As a result, the grease applied between the plurality of gear teeth 23t and the plurality of internal teeth 25tr and between each pinion gear 23 and a washer 23w, etc. can be suppressed from flowing out to the outer radial side due to centrifugal force, and wear of the plurality of gear teeth 23t, the plurality of internal teeth 25tr, the pinion gear 23, the washer 24w, and the like can be suppressed. Further, in the dry damper device 10, a resin sheet or the like is disposed between two members that rotate relative to each other.

Subsequently, the operation of the above-described damper device 10 will be described.

As described above, when the clutch K0 is engaged in accordance with the satisfaction of the engagement condition of the clutch K0, a drive torque from the engine EG is transmitted to the drive member 11, that is, the front cover 3 and the rear cover 21. A torque (average torque) transmitted from the engine EG to the drive member 11 is transmitted to the driven member 15 via the first torque transmission path TP1 including the plurality of first springs SP1, the intermediate member 12, and the plurality of second springs SP2, until the input torque reaches the torque T1 described above. Then, a torque transmitted to the driven member 15 is transmitted to the drive shaft DS via the transmission shaft TS, the clutch K0, the rotor R of the motor generator MG, the clutch K2, the transmission TM, the differential gear DF, and the like.

Further, when the drive member 11 rotates (twists) with respect to the driven member 15, the first and second springs SP1, SP2 and the like are deflected, and the sun gear 22 serving as the mass body rotates (swings) in accordance with a relative rotation of the drive member 11 and the driven member 15. When the drive member 11 rotates (swings) with respect to the driven member 15 in this way, a rotation speed of the rear cover 21 serving as a carrier, which is an input element of the planetary gear mechanism PG, becomes higher than a rotation speed of the driven plate 25 serving as a ring gear. Thus, at this time, the sun gear 22 is accelerated by the action of the planetary gear mechanism PG, and rotates at a rotation speed higher than that of the rear cover 21, that is, the drive member 11. As a result, an inertial torque is applied from the sun gear 22, which is the mass body of the rotary inertia mass damper 20, to the driven plate 25, that is, the driven member 15, which is the output element of the damper device 10, via the pinion gear 23 and vibration of the driven member 15 can be dampened. The rotary inertia mass damper 20 mainly transmits an inertial torque between the drive member 11 and the driven member 15, and does not transmit an average torque.

More specifically, when the first and second springs SP1, SP2 and the rotary inertia mass damper 20 act in parallel, a torque (average torque) transmitted from the plurality of second springs SP2 (first torque transmission path TP1) to the driven member 15 depends on (is proportional to) a displacement (a deflection amount, that is, a torsion angle) of the second spring SP2 between the intermediate member 12 and the driven member 15. In contrast, a torque (inertial torque) transmitted from the rotary inertia mass damper 20 to the driven member 15 depends on (is proportional to) the difference in angular acceleration between the drive member 11 and the driven member 15, that is, a two-time differential value of the displacement of the first and second springs SP1, SP2 between the drive member 11 and the driven member 15. As a result, assuming that an input torque transmitted to the drive member 11 of the damper device 10 vibrates periodically, a phase of the vibration transmitted from the drive member 11 to the driven member 15 via the plurality of second springs SP2 and a phase of the vibration transmitted from the drive member 11 to the driven member 15 via the rotary inertia mass damper 20 are deviated by 180°. As a result, in the damper device 10, it is possible to satisfactorily dampen the vibration of the driven member 15 by having one of the vibration transmitted from the plurality of second springs SP2 to the driven member 15 and the vibration transmitted from the rotary inertia mass damper 20 to the driven member 15 cancel out at least a part of the other one.

Further, in the damper device 10 including the intermediate member 12, two natural frequencies (resonance frequencies) are set for a state in which deflection of the first and second springs SP1, SP2 is allowed and the springs SPx are not deflected. That is, in the first torque transmission path TP1, when deflection of the first and second springs SP1, SP2 is allowed, the springs SPx are not deflected, and a rotation speed Ne of the engine EG (a rotation speed of the drive member 11) is extremely low, for example, resonance (first resonance) occurs due to the drive member 11 and the driven member 15 vibrating in opposite phases to each other.

Further, the natural frequency f12 of the intermediate member 12 in a single-degree-of-freedom system is expressed as $$f12 = 1/2\pi \cdot \sqrt{((k1+k2)/J12)}$$

(wherein, "J12" is a moment of inertia of the intermediate member 12, "k1" is a combined spring constant of the plurality of first springs SP1 acting in parallel between the drive member 11 and the intermediate member 12, and "k2" is a combined spring constant of the plurality of second springs SP2 acting in parallel between the intermediate member 12 and the driven member 15). Since the moment of inertia J12 becomes relatively large by forming the intermediate member 12 in an annular shape, the natural frequency f12 of the intermediate member 12 becomes relatively small. As a result, in the first torque transmission path TP1, at a stage in which the rotation speed Ne of the engine EG is increased to be higher than a rotation speed corresponding to the frequency of the first resonance to a certain extent when deflection of the first and second springs SP1, SP2 is allowed and the springs SPx are not deflected, a resonance (second resonance) of the intermediate member 12 resulting from the intermediate member 12 vibrating at a phase opposite to that of both the drive member 11 and the driven member 15 is generated.

However, an amplitude of the vibrations transmitted from the first torque transmission path TP1 (second springs SP2) to the driven member 15 changes from being decreased to being increased before the rotation speed Ne of the engine EG reaches the rotation speed corresponding to the relatively small natural frequency $f_{12}$ of the intermediate member 12. In contrast, an amplitude of the vibration transmitted from the rotary inertia mass damper 20 to the driven member 15 is gradually increased as the rotation speed Ne of the engine EG is increased. Thus, in the damper device 10, due to two peaks, that is, the first and second resonances being generated in a torque transmitted via the first torque transmission path TP1 as a result of the presence of the intermediate member 12, a total of two anti-resonance points at which the vibration amplitude of the driven member 15 becomes theoretically zero can be set. Therefore, in the damper device 10, the vibration of the driven member 15 can be dampened extremely satisfactorily, by making the amplitude of the vibration in the first torque transmission path TP1 and the amplitude of the vibration in the rotary inertia mass damper 20 that is the opposite phase thereof as close as possible, at the two points corresponding to the first and second resonances generated in the first torque transmission path TP1.

Here, the driven member 15 of the damper device 10, that is, the damper hub 7 and the driven plate 25 are coupled to the rotor R of the motor generator MG via the transmission shaft TS and the clutch K0, and the rotor R is coupled to the input shaft IS of the transmission TM via the clutch K2. When the motor generator MG is disposed between the damper device 10 and the transmission TM and the engine EG, the damper device 10, the motor generator MG and the transmission TM are coupled in this order, the moment of inertia of the rotor R of the motor generator MG and the moment of inertia of the components of the clutches K0, K2 and the like are added to the moment of inertia of the input shaft IS of the transmission TM, in addition to the moment of inertia of the driven member 15 and an intermediate shaft not shown, and the like.

Figure 4:
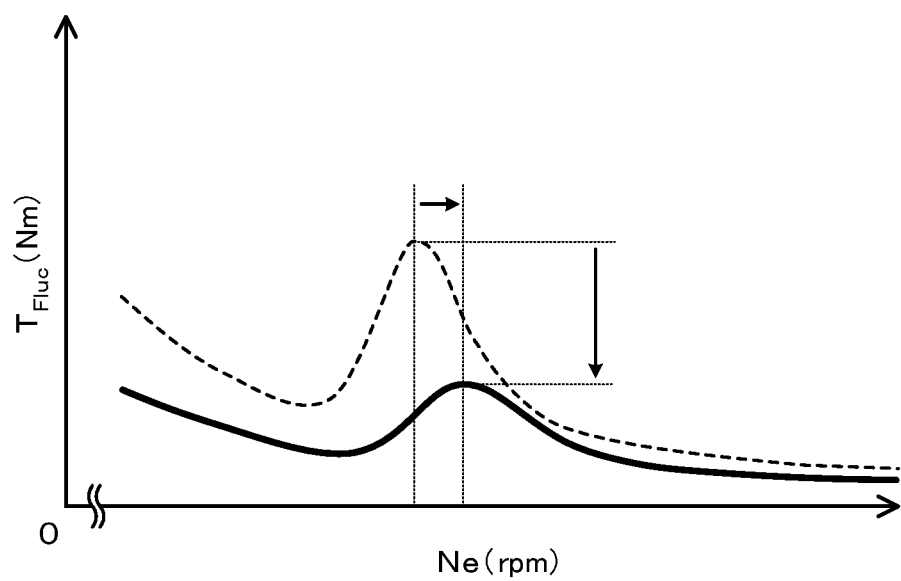
FIG. 4 is an explanatory diagram illustrating a relationship between a rotation speed of an engine and a torque fluctuation $T_{Fluc}$ in an output element of the damper device according to the first embodiment.

Therefore, when the natural frequency of the input shaft IS of the transmission TM that rotates integrally with the driven member 15 and the rotor R, etc. becomes small and the damper device 10 is not provided with the rotary inertia mass damper 20, as shown by a broken line in FIG. 4, a shaft resonance, which is a resonance of the input shaft IS of the transmission TM and the like, is generated from a medium speed range to a high speed range (for example, around 1,500 to 4,000 rpm) in a operation rotation speed range (a range from zero to an upper limit rotation speed) of the engine EG, and the damper device 10 cannot sufficiently dampen the torque fluctuation $T_{Fluc}$ resulting from the shaft resonance. Further, the frequency of such a shaft resonance largely depends on the rigidity of the input shaft IS and the moment of inertia (inertia) of the rotor R of the motor generator MG coupled to the input shaft IS. Therefore, even if the rigidity of the first and second springs SP1, SP2 of the damper device 10 is lowered (the spring constant is reduced) or a further spring is added to the damper device 10, it is difficult to sufficiently change the frequency so that the shaft resonance does not become apparent.

Based on this, as described above, the damper device 10 is configured so that the rear cover 21 that is a part of the drive member 11 functions as a carrier of the planetary gear mechanism PG (rotary inertia mass damper 20) and the driven plate 25 that is a part of the driven member 15 functions as a ring gear of the planetary gear mechanism PG. As a result, due to a characteristic of the rotary inertia mass damper 20 including the planetary gear mechanism PG, while the moment of inertia larger than the total value of the moment of inertia of the plurality of pinion gears 23 and the sun gear 22 serving as the mass body is applied to the rear cover 21 serving as a carrier, that is, the drive member 11, the moment of inertia of the driven plate 25 serving as the ring gear, that is, the driven member 15 can be decreased.

More specifically, in a case in which the moment of inertia of the sun gear 22 including the gear member 221, the spacer 222 and the annular member 223 is set as "Js", the total value of the moment of inertia of the plurality of pinion gears 23 is set as "Jp", and a gear ratio of the planetary gear mechanism PG (the number of teeth of the sun gear 22 (external teeth 22t) divided by the number of teeth of the internal teeth 25tr) is set as "λ", a moment of inertia Ji distributed to the drive member 11 by the planetary gear mechanism PG and the moment of inertia Jo distributed to the driven member 15 by the planetary gear mechanism PG is expressed by the following equations (1) and (2). In the present embodiment, the moment of inertia Js of the sun gear 22 is sufficiently larger than the total value Jp of the moment of inertia of the plurality of pinion gears 23, and the moment of inertia Ji distributed to the drive member 11 becomes a positive value larger than the total value (Js+Jp) of the moment of inertia of the sun gear 22 and the plurality of pinion gears 23. Further, the moment of inertia Jo distributed to the driven member 15 is $$Jo = Js + Jp - Ji$$

Jo is a negative value. That is, the moment of inertia Js of the sun gear 22 serving as the mass body of the rotary inertia mass damper 20, etc., the moment of inertia Jp of the plurality of pinion gears 23, and the gear ratio λ of the planetary gear mechanism PG are set such that the moment of inertia Jo distributed to the driven member 15 by the planetary gear mechanism PG becomes a negative value. Further, the moment of inertia Js, the moment of inertia Jp, and the gear ratio λ are preferably set so as to satisfy Jo+Jm≥0 when the moment of inertia of the rotor R of the motor generator MG is "Jm".

[Equations 1 and 2]

$$Ji = Js1 + \lambda/\lambda + Jp - (1+\lambda)/1 - \lambda \qquad (1)$$

$$Jo = -Js1/\lambda + Jp2/1 - \lambda \qquad (2)$$

As a result, it is possible to suppress an increase in the moment of inertia (total value) of the input shaft IS of the transmission TM that rotates integrally with the driven member 15 and the rotor R of the motor generator MG, and thereby a decrease in the frequency of the shaft resonance can be suppressed. Further, in the damper device 10, the vibration (inertial torque) having a opposite phase of the vibration transmitted from the second springs SP2 to the driven member 15 can be transmitted from the rotary inertia mass damper 20 to the driven member 15, and as shown by a solid line in FIG. 4, the torque fluctuation $T_{Fluc}$ due to the shaft resonance can be decreased by the vibration transmitted from the rotary inertia mass damper 20 to the driven member 15. Further, the level of the shaft resonance decreases as the frequency, that is, the rotation speed of the input shaft IS increases. Thus, with the damper device 10, it is possible to satisfactorily suppress the shaft resonance of the transmission TM from being generated in a relatively low rotation range and becoming apparent.

In a damper device (not shown) configured such that a part of the drive member 11 functions as a ring gear and a part of the driven member 15 functions as a carrier, and the sun gear 22 functions as a mass body, the moment of inertia distributed to the drive member 11 by the planetary gear mechanism PG is represented by the above equation (2), and the moment of inertia distributed to the driven member 15 by the planetary gear mechanism PG is represented by the above equation (1). Thus, in such a damper device, it is difficult to suppress an increase in the moment of inertia (total value) of the input shaft IS of the transmission TM, that is, a decrease in the frequency of the shaft resonance. Further, according to the research by the present inventors, it has been found that when the carrier of the planetary gear mechanism PG functions as a mass body, the moment of inertia of each pinion gear must be made very large in order to set the anti-resonance point, which causes an increase in size and weight of the damper device.

Further, in the damper device 10, the driven plate 25 that is a part of the driven member 15 functions as a ring gear, the sun gear 22 functions as a mass body, and the first and second springs SP1, SP2 are disposed radially outward of the plurality of pinion gears 23. This makes it possible to reduce the rigidity of the first and second springs SP1, SP2 (the combined springs of the first and second springs SP1, SP2) and further improve the vibration damping performance of the damper device 10.

Further, the sun gear 22 includes the gear member 221 that has the external teeth 22t that mesh with the gear teeth 23t of the plurality of pinion gears 23, and the annular member 223 that is disposed on the outer side in the axial direction of the rear cover 21, which is formed in an annular shape, and that is coupled to the gear member 221 via the spacer 222, on the inner radial side of the rear cover 21. As a result, the moment of inertia Js of the sun gear 22 serving as a mass body can be made larger, the vibration damping performance of the rotary inertia mass damper 20 can be improved, and the moment of inertia (total value) of the input shaft IS of the transmission TM can be increased, that is, a decrease in the frequency of the shaft resonance can be satisfactorily suppressed.

Further, the rear cover 21 serving as a carrier includes the torque transmitting and receiving portion 25c for transmitting and receiving torque to and from the second springs SP2, and supports the plurality of pinion shafts 24 each inserted through the pinion gears 23, on the inner radial side of the torque transmitting and receiving portion 25c. As a result, the plurality of pinion shafts 24 can be supported by the part to which an average torque of the rear cover 21 serving as a carrier is not transmitted, and the deformation of the pinion shafts 24 can be suppressed to satisfactorily maintain the performance of the rotary inertia mass damper 20.

Then, in the damper device 10, the other end portion of each spring SPx comes in contact with the corresponding spring contact portion 25x of the driven plate 25 when an input torque and the like becomes equal to or more than the torque T1 described above and the torsion angle of the drive member 11 with respect to the driven member 15 becomes equal to or more than the predetermined angle θref. As a result, a torque (average torque) transmitted to the drive member 11 is transmitted to the driven member 15 via the first torque transmission path TP1 and the second torque transmission path TP2 including the plurality of springs SPx, until an input torque and the like reaches the torque T2 described above and a relative rotation of the drive member 11 and the driven member 15 is restricted by the stopper 17. As a result, the rigidity of the damper device 10 can be increased in accordance with the increase in the relative torsion angle of the drive member 11 and the driven member 15, and the first and second springs SP1, SP2 and the springs SPx acting in parallel can transmit a large torque and receive an impact torque, and the like. Further, by disposing the springs SPx in the spring holding recess portions 21x formed on the inner surface of the corner portion on the outer peripheral side of the rear cover 21, it is possible to suppress an increase in the axial length of the damper device 10.

Figure 5:
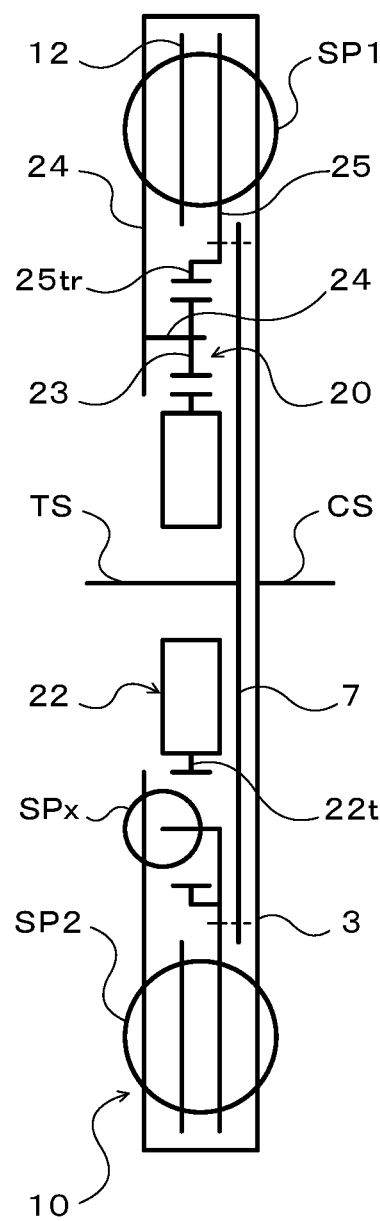
FIG. 5 is a schematic configuration diagram showing a damper device according to a modification of the first embodiment.
Figure 6:
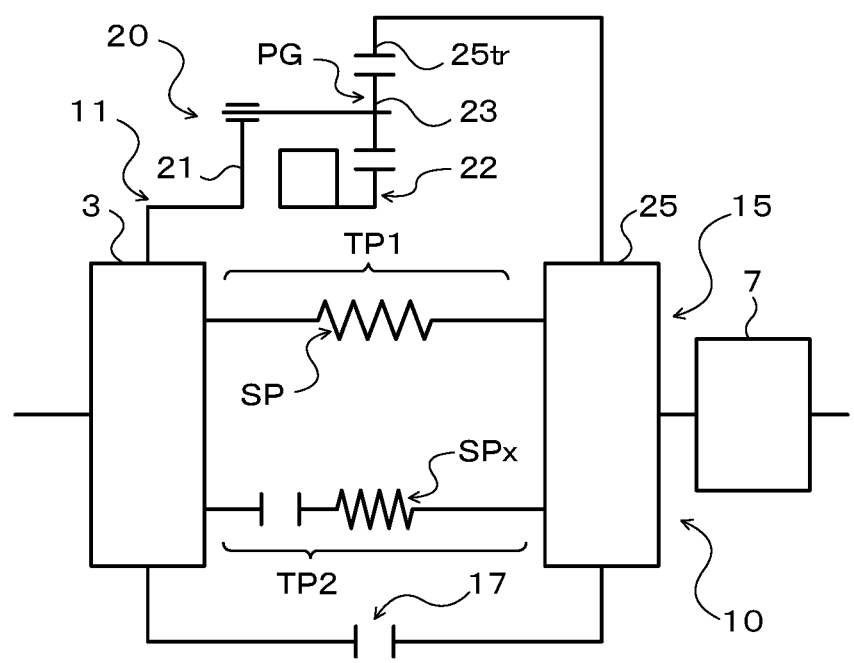
FIG. 6 is a schematic configuration diagram showing a damper device according to another modification of the first embodiment.

However, in the damper device 10, as shown in FIG. 5, the plurality of springs SPx may be disposed so as to be adjacent to the plurality of pinion gears 23 in the circumferential direction on an inner side of the first and second springs SP1, SP2 in the radial direction of the damper device 10. As a result, the damper device 10 can be made compact. Further, in the damper device 10, as shown in FIG. 6, the first torque transmission path TP1 may be configured by a plurality of (for example, six) springs SP that can act in parallel with each other between the drive member 11 and the driven member 15 so as to transmit a torque.

Figure 7:
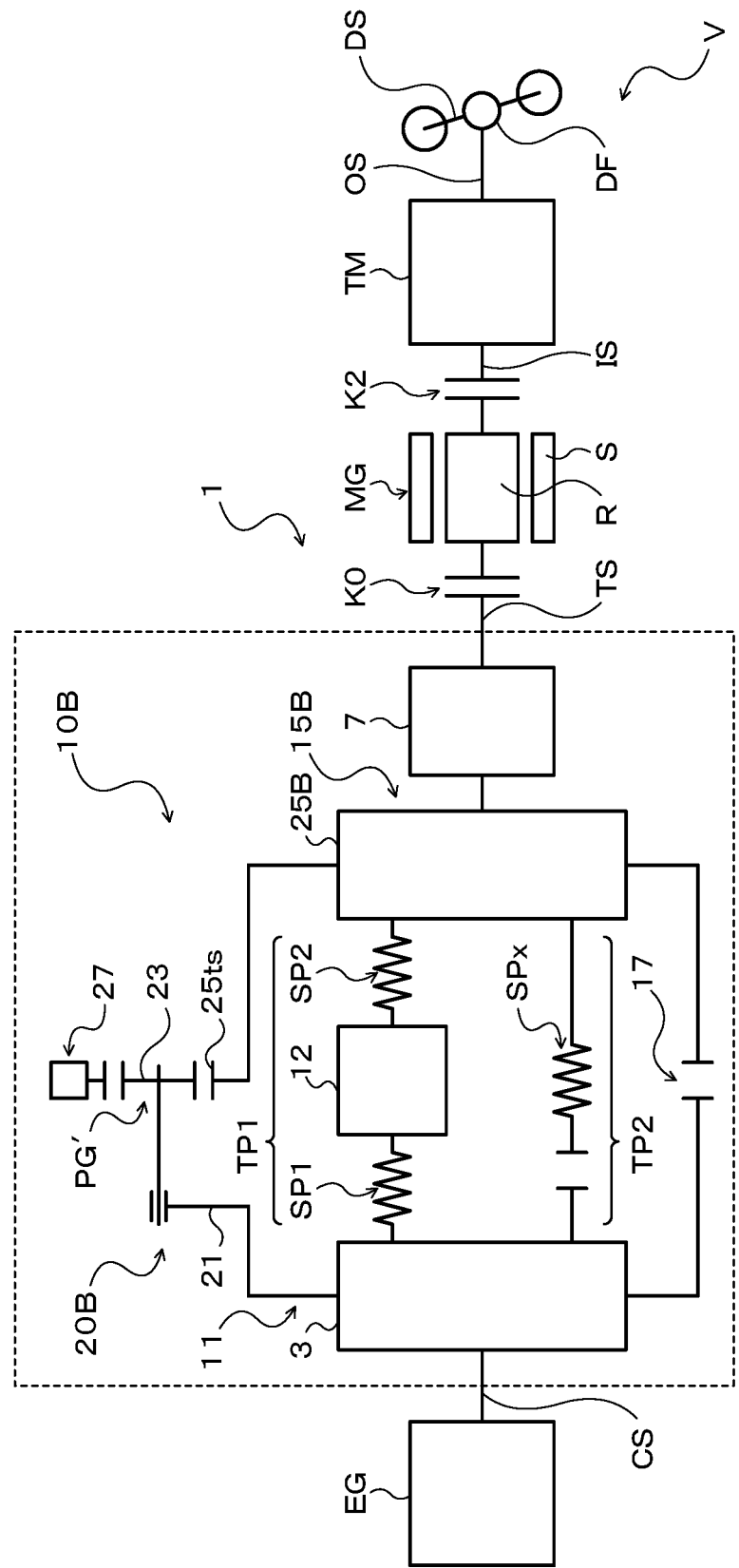
FIG. 7 is a schematic configuration diagram showing a damper device according to a second embodiment of the present disclosure.

FIG. 7 is a schematic configuration diagram showing a damper device 10B according to a second embodiment of the present disclosure. Among elements related to the damper device 10B, the same elements as those of the damper device 10 and the like described above are designated by the same reference numerals, and redundant description will be omitted.

Figure 8:
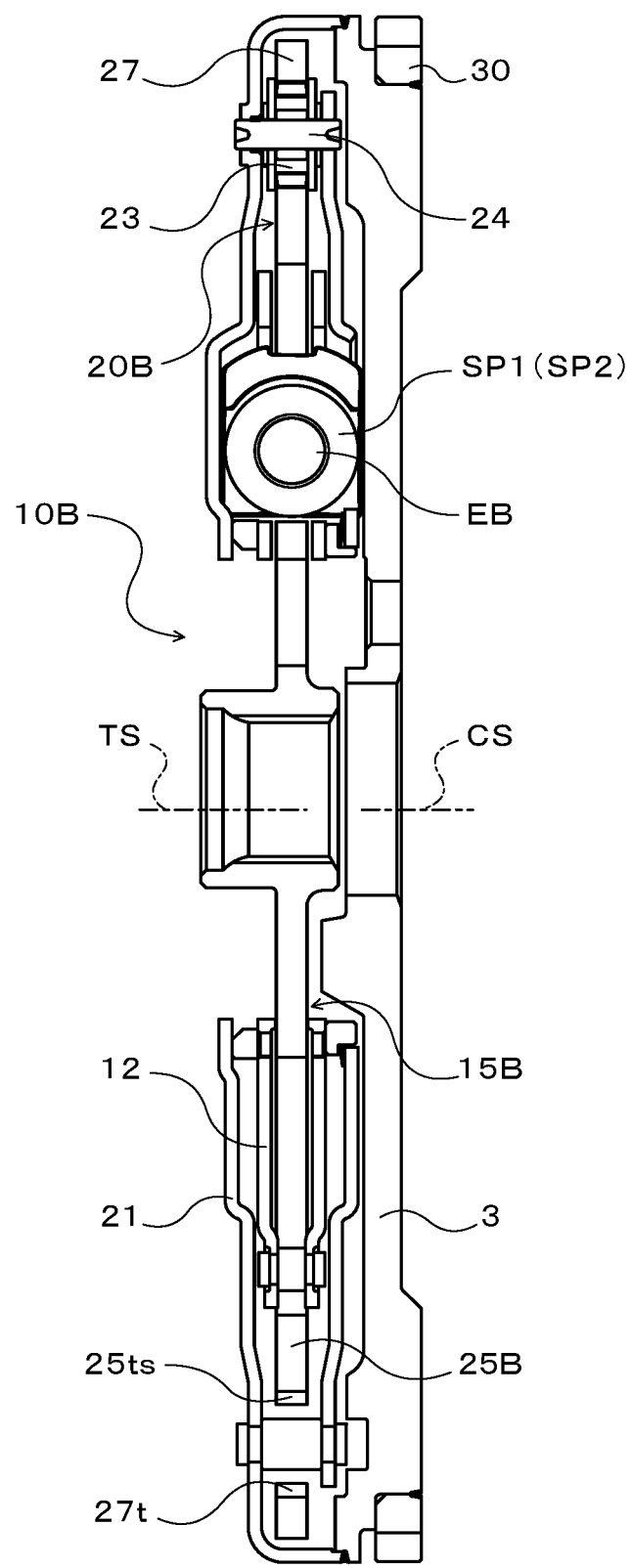
FIG. 8 is a schematic configuration diagram showing a damper device according to a modification of the second embodiment.

In the damper device 10B shown in FIGS. 7 and 8, external teeth 25ts that mesh with the gear teeth 23t of the plurality of pinion gears 23 are formed on an outer periphery of a driven plate 25B included in a driven member 15B, and the driven plate 25B functions as a sun gear of a planetary gear mechanism PG. Further, in the damper device 10B, a ring gear 27 of the planetary gear mechanism PG including internal teeth 27t that mesh with the gear teeth 23t of the plurality of pinion gears 23 functions as a mass body of a rotary inertia mass damper 20B. Further, in the damper device 10B, as shown in FIG. 8, the first and second springs SP1, SP2 are disposed on an inner side of the plurality of pinion gears 23 in the radial direction.

In such a damper device 10B, regardless of the size of the moment of inertia of the ring gear 27 serving as the mass body, while the moment of inertia larger than the total value of the moment of inertia of the plurality of pinion gears 23 and the ring gear 27 is applied to the rear cover 21 serving as a carrier, that is, the drive member 11, the moment of inertia of the driven plate 25B serving as a sun gear, that is, the driven member 15B can be decreased. More specifically, in a case in which the moment of inertia of the ring gear 27 is set as "Jr", the total value of the moment of inertia of the plurality of pinion gears 23 is set as "Jp", and a gear ratio of the planetary gear mechanism PG' (the number of teeth of the external teeth 25ts divided by the number of teeth of the ring gear 27) is set as "λ", the moment of inertia Ji distributed to the drive member 11 by the planetary gear mechanism PG' and the moment of inertia Jo distributed to the driven member 15B by the planetary gear mechanism PG' is expressed by the following equations (3) and (4). As can be seen from the equations (3) and (4), the moment of inertia Ji distributed to the drive member 11 is always a positive value larger than the total value (Jr+Jp) of the moment of inertia of the ring gear 27 and the moment of inertia of the plurality of pinion gears 23. Further, the moment of inertia Jo distributed to the driven member 15 is Jo=Jr+Jp−Ji, and is always a negative value.

[Equations 3 and 4]

$$Ji = Jr + (1+\lambda) + Jp1 + \lambda/1-\lambda \quad (3)$$

$$Jo = -Jr\lambda - Jp2\lambda/1-\lambda \quad (4)$$

As a result, also with the damper device 10B, it is possible to suppress an increase in the moment of inertia (total value) of the input shaft IS of the transmission TM that rotates integrally with the driven member 15B and the rotor R of the motor generator MG, that is, it is possible to suppress a decrease in the frequency of the shaft resonance. Further, also in the damper device 10B, the vibration (inertial torque) having a opposite phase of the vibration transmitted from the second springs SP2 to the driven member 15B can be transmitted from the rotary inertia mass damper 20B to the driven member 15B, the torque fluctuation $T_{Fluc}$ due to the shaft resonance can be decreased by the vibration transmitted from the rotary inertia mass damper 20B to the driven member 15B. Thus, also with the damper device 10B, it is possible to satisfactorily suppress the shaft resonance of the transmission TM from being generated in a relatively low rotation range and becoming apparent.

In a damper device (not shown) configured such that a part of the drive member 11 functions as a sun gear and a part of the driven member 15B functions as a carrier, and the ring gear 27 functions as a mass body, the moment of inertia distributed to the drive member 11 by the planetary gear mechanism PG' is represented by the above equation (4), and the moment of inertia distributed to the driven member 15B by the planetary gear mechanism PG' is represented by the above equation (3). Thus, in such a damper device, it is difficult to suppress an increase in the moment of inertia (total value) of the input shaft IS of the transmission TM, that is, a decrease in the frequency of the shaft resonance.

Figure 9:
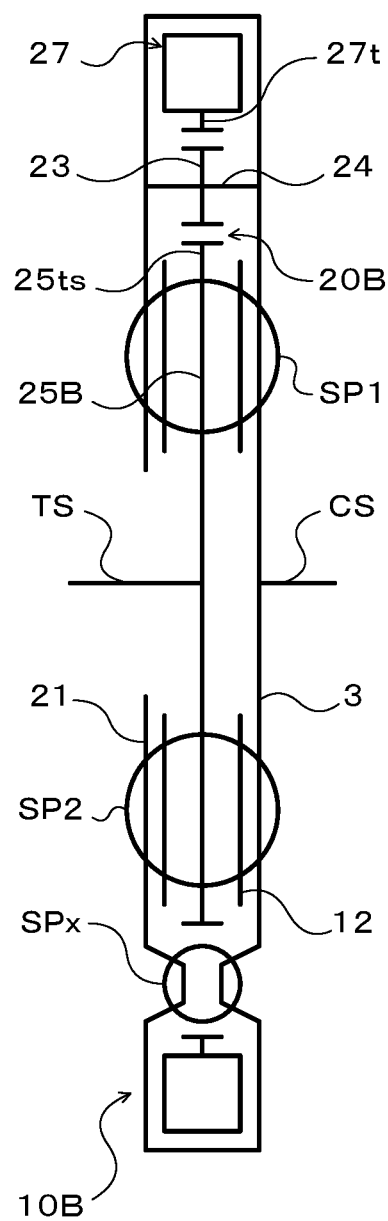
FIG. 9 is a schematic configuration diagram showing a damper device according to another modification of the second embodiment.
Figure 10:
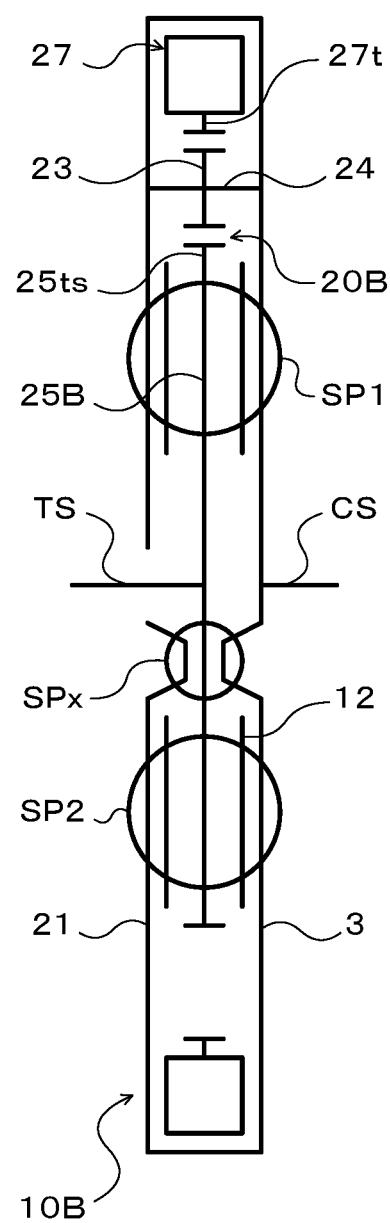
FIG. 10 is a schematic configuration diagram showing a damper device according to still another modification of the second embodiment.
Figure 11:
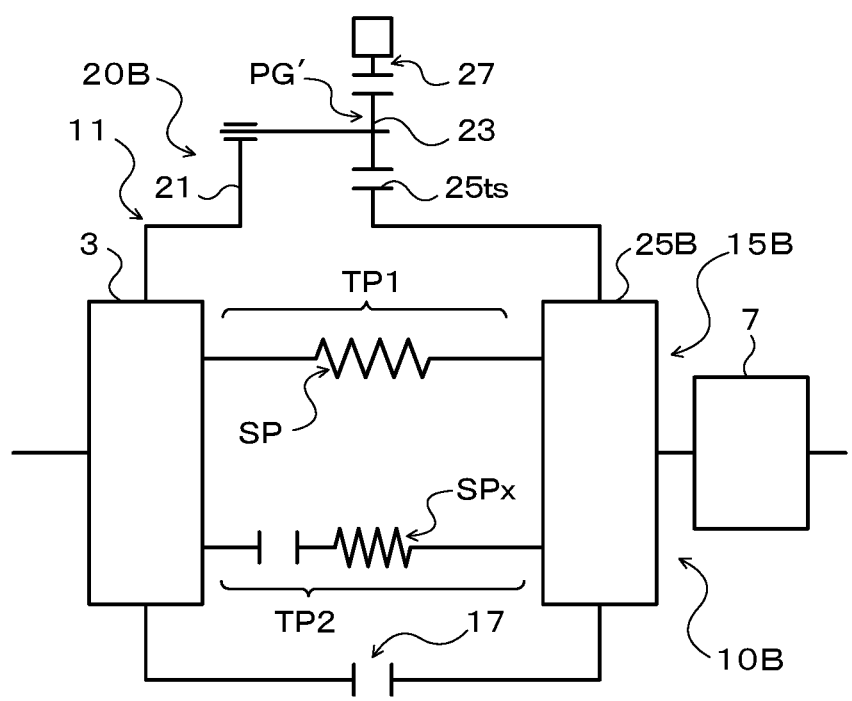
FIG. 11 is a schematic configuration diagram showing a damper device according to the modification of the second embodiment.

Further, in the damper device 10B, as shown in FIG. 8, short columnar elastic bodies (second elastic bodies) EB made of rubber or resin and having the same functions as the springs SPx are disposed inside at least one of the first and second springs SP1, SP2 coaxially therewith. However, in the damper device 10B, as shown in FIG. 9, the plurality of springs SPx may be disposed so as to be adjacent to the plurality of pinion gears 23 in the circumferential direction on the outer side of the first and second springs SP1, SP2 in the radial direction of the damper device 10B. Further, as shown in FIG. 10, the plurality of springs SPx may be disposed on the inner side of the first and second springs SP1, SP2 in the radial direction of the damper device 10B. Further, as shown in FIG. 11, the first torque transmission path TP1 of the damper device 10B may be configured by a plurality of (for example, six) springs SP that can act in parallel with each other between the drive member 11 and the driven member 15B so as to transmit a torque.

As described above, a damper device of the present disclosure is a damper device (10, 10B) including: an input element (11) to which a torque from an engine (EG) is transmitted; an output element (15, 15B); an elastic body (SP1, SP2, SP) that transmits a torque between the input element (11) and the output element (15, 15B); and rotary inertia mass damper (20, 20B) having a mass body (22, 27) that rotates in accordance with a relative rotation of the input element (11) and the output element (15, 15B), in which the output element (15, 15B) is coupled to a rotor (R) of an electric motor (MG), the rotor (R) of the electric motor (MG) is coupled to an input shaft (IS) of a transmission (TM), the rotary inertia mass damper (20, 20B) includes a planetary gear mechanism (PG, PG') having a sun gear (22, 25B), a ring gear (25, 27), a plurality of pinion gears (23), and a carrier (21) that supports the plurality of pinion gears (23), the carrier (21) is a part of the input element (11), and one (25, 25B) of the sun gear and the ring gear is a part of the output element (15, 15B), and the other (22, 27) of the sun gear and the ring gear functions as the mass body.

In the damper device of the present disclosure, the output element is coupled to the rotor of the electric motor, and the input shaft of the transmission is coupled to rotor of the electric motor. When the electric motor is disposed between the damper device and the transmission in this way, the moment of inertia of the rotor, in addition to the moment of inertia of the output element, is applied to the moment of inertia of the input shaft of the transmission and thus, the natural frequency of the input shaft of the transmission that rotates integrally with the output element and the rotor, that is, the frequency of the shaft resonance, becomes smaller. Based on this, the damper device of the present disclosure is configured such that a part of the input element functions as a carrier of the planetary gear mechanism (rotary inertia mass damper), and a part of the output element functions as one of the sun gear and the ring gear. Thus, due to a characteristic of the rotary inertia mass damper including the planetary gear mechanism, while the moment of inertia larger than the total value of the moment of inertia of the plurality of pinion gears and the other of the sun gear and the ring gear serving as the mass body is applied to the carrier, that is, the input element, the moment of inertia of the one of the sun gear and the ring gear, that is, the output element can be decreased. As a result, it is possible to suppress an increase in the moment of inertia (total value) of the input shaft of the transmission that rotates integrally with the output element and the rotor of the electric motor, that is, it is possible to suppress a decrease in the frequency of shaft resonance. Further, in the damper device of the present disclosure, it is possible to transmit, from the rotary inertia mass damper to the output element, the vibration (inertial torque) having an opposite phase of the vibration transmitted from the elastic body to the output element, and the torque fluctuation resulting from the shaft resonance can be decreased with the vibration transmitted from the rotary inertia mass damper to the output element. Thus, with the damper device of the present disclosure, it is possible to satisfactorily suppress the shaft resonance of the transmission from being generated in a relatively low rotation range and becoming apparent.

Further, the ring gear (25) may be a part of the output element (15), the sun gear (22) may function as the mass body, and the elastic body (SP1, SP2, SP) may be disposed on an outer side of the plurality of pinion gears (23) in a radial direction of the damper device (10). This makes it possible to reduce the rigidity of the elastic body and further improve the vibration damping performance of the damper device.

Further, the input element (11) including the carrier (21) may be formed so as to surround the elastic body (SP1, SP2, SP), the ring gear (25), and the plurality of pinion gears (23).

The carrier (21) may be formed in an annular shape, and the sun gear (22) may include a gear member (221) having external teeth (22t) that mesh with gear teeth (23t) of the plurality of pinion gears (23), and an annular member (223) that is disposed on an outer side of the carrier (21) in an axial direction of the damper device (10) and that is coupled to the gear member (221) on an inner side of the carrier (21) in a radial direction of the damper device (10). As a result, the moment of inertia of the sun gear serving as a mass body can be made larger, the vibration damping performance of the rotary inertia mass damper can be improved, and the moment of inertia (total value) of the input shaft of the transmission can be increased, that is, a decrease in the frequency of the shaft resonance can be satisfactorily suppressed.

Further, the carrier (21) may include a torque transmitting and receiving portion (21c) that transmits and receives a torque to and from the corresponding elastic body (SP1, SP2, SP), and support one end of a plurality of pinion shafts (24) each inserted through the pinion gear (23) on an inner side of the torque transmitting and receiving portion (21c) in the radial direction of the damper device (10). As a result, the plurality of pinion shafts can be supported by the part to which an average torque of the carrier is not transmitted, and the deformation of the pinion shafts can be suppressed to satisfactorily maintain the performance of the rotary inertia mass damper.

Further, the sun gear (25B) may be a part of the output element (15B), the ring gear (27) may function as the mass body, and the elastic body (SP1, SP2, SP) may be disposed on an inner side of the plurality of pinion gears (23) in a radial direction of the damper device (10B). Thus, regardless of the size of the moment of inertia of the ring gear serving as the mass body, while the moment of inertia larger than the total value of the moment of inertia of the plurality of pinion gears and the ring gear is applied to the carrier, that is, the input element, the moment of inertia of the sun gear, that is, the output element can be decreased.

Further, the input element (11) including the carrier (21) may be formed so as to surround the elastic body (SP1, SP2, SP), the ring gear (27), and the plurality of pinion gears (23).

The damper device (10, 10B) may include an intermediate element (12), and the elastic body may include an input side elastic body (SP1) that transmits a torque between the input element (11) and the intermediate element (12), and an output side elastic body (SP2) that transmits a torque between the intermediate element (12) and the output element (15, 15B). As a result, since it is possible to set two anti-resonance points in which the vibration transmitted from the output side elastic body to the output element and the vibration transmitted from the rotary inertia mass damper to the output element theoretically cancel each other out, the vibration damping performance of the damper device can be improved furthermore.

Further, the damper device (10, 10B) may include a second elastic body (SPx) that acts in parallel with the elastic body (SP1, SP2, SP) when a torque transmitted between the input element (11) and the output element (15, 15B) is equal to or more than a predetermined value (T1). Thus, the rigidity of the damper device can be increased in accordance with the increase of a torque transmitted between the input element and the output element, and the elastic body and the second elastic body acting parallel can transmit a large torque and receive an impact torque, and the like.

The second elastic body (SPx) may be disposed on an outer side of the elastic body (SP1, SP2, SP) in a radial direction of the damper device (10, 10B).

Further, the second elastic body (SPx) may be disposed on an inner side of the elastic body (SP1, SP2, SP) in a radial direction of the damper device (10, 10B).

The second elastic body (SPx) may be disposed so as to at least partially overlap with the elastic body (SP1, SP2, SP) when viewed in a radial direction of the damper device (10, 10B).

Further, the elastic body (SP1, SP2, SP) may be a coil spring, and the second elastic body (EB) may be disposed inside the elastic body (SP1, SP2, SP) coaxially with the elastic body (SP1, SP2, SP).

The second elastic body (SPx) may be disposed so as to be adjacent to the plurality of pinion gears (23) in a circumferential direction.

Further, the damper device (10, 10B) may be a dry damper.

A clutch (K0, K2) may be disposed between the damper device (10, 10B) and the electric motor (MG), and between the electric motor (MG) and the transmission (TM).

Further, a moment of inertia of the mass body (22, 27), a moment of inertia of the plurality of pinion gears (23), and a gear ratio (2) of the planetary gear mechanism (PG, PG') may be set such that a moment of inertia distributed to the output element (15, 15B) by the planetary gear mechanism (PG, PG') is a negative value.

Further, it goes without saying that the invention of the present disclosure is not limited to the embodiments described above, and various modifications can be made within the scope of the extension of the present disclosure. Furthermore, the form for carrying out various aspects of the invention described above are merely one specific form described in the SUMMARY OF THE INVENTION, and does not limit the elements of the invention described in the SUMMARY OF THE INVENTION.

INDUSTRIAL APPLICABILITY

Aspects of the present disclosure can be used in a manufacturing field of a damper device and the like.

The invention claimed is:

1. A damper device comprising:
an input element to which a torque from an engine is transmitted;
an output element;
an elastic body that transmits a torque between the input element and the output element; and
a rotary inertia mass damper having a mass body that rotates in accordance with a relative rotation of the input element and the output element, wherein
the output element is coupled to a rotor of an electric motor,
the rotor of the electric motor is coupled to an input shaft of a transmission,
the rotary inertia mass damper includes a planetary gear mechanism having a sun gear, a ring gear, a plurality of pinion gears, and a carrier that supports the plurality of pinion gears, and
the carrier is a part of the input element, one of the sun gear and the ring gear is a part of the output element, and the other of the sun gear and the ring gear functions as the mass body,
wherein
the ring gear is a part of the output element,
the sun gear functions as the mass body, and
the elastic body is disposed on an outer side of the plurality of pinion gears in a radial direction of the damper device.

2. The damper device according to claim 1, wherein the input element including the carrier is formed so as to surround the elastic body, the ring gear, and the plurality of pinion gears.

3. The damper device according to claim 2, wherein
the carrier is formed in an annular shape, and
the sun gear includes a gear member having external teeth that mesh with gear teeth of the plurality of pinion gears, and an annular member that is disposed on an outer side of the carrier in an axial direction of the damper device and that is coupled to the gear member on an inner side of the carrier in a radial direction of the damper device.

4. The damper device according to claim 2, wherein the carrier includes a torque transmitting and receiving portion that transmits and receives a torque to and from the corresponding elastic body, and supports one end of a plurality of pinion shafts each inserted through the pinion gear on an inner side of the torque transmitting and receiving portion in the radial direction of the damper device.

5. The damper device according to claim 1, wherein the damper device is a dry damper.

6. The damper device according to claim 1, wherein a clutch is disposed between the damper device and the electric motor, and between the electric motor and the transmission.

7. The damper device according to claim 1, wherein a moment of inertia of the mass body, a moment of inertia of the plurality of pinion gears, and a gear ratio of the planetary gear mechanism are set such that a moment of inertia distributed to the output element by the planetary gear mechanism is a negative value.

8. A damper device comprising:
an input element to which a torque from an engine is transmitted;
an output element;
an elastic body that transmits a torque between the input element and the output element; and
a rotary inertia mass damper having a mass body that rotates in accordance with a relative rotation of the input element and the output element, wherein
the output element is coupled to a rotor of an electric motor,
the rotor of the electric motor is coupled to an input shaft of a transmission,
the rotary inertia mass damper includes a planetary gear mechanism having a sun gear, a ring gear, a plurality of pinion gears, and a carrier that supports the plurality of pinion gears, and
the carrier is a part of the input element, one of the sun gear and the ring gear is a part of the output element, and the other of the sun gear and the ring gear functions as the mass body, wherein
the sun gear is a part of the output element,
the ring gear functions as the mass body, and
the elastic body is disposed on an inner side of the plurality of pinion gears in a radial direction of the damper device.

9. The damper device according to claim 8, wherein the input element including the carrier is formed so as to surround the elastic body, the ring gear, and the plurality of pinion gears.

10. The damper device according to claim 8, wherein
the damper device further has an intermediate element, and
the elastic body includes an input side elastic body that transmits a torque between the input element and the intermediate element, and an output side elastic body that transmits a torque between the intermediate element and the output element.

11. The damper device according to claim 8, wherein the damper device further includes a second elastic body that acts in parallel with the elastic body when a torque transmitted between the input element and the output element is equal to or more than a predetermined value.

12. The damper device according to claim 11, wherein the second elastic body is disposed on an outer side of the elastic body in a radial direction of the damper device.

13. The damper device according to claim 12, wherein the second elastic body is disposed so as to be adjacent to the plurality of pinion gears in a circumferential direction.

14. The damper device according to claim 11, wherein the second elastic body is disposed on an inner side of the elastic body in a radial direction of the damper device.

15. The damper device according to claim 14, wherein the second elastic body is disposed so as to be adjacent to the plurality of pinion gears in a circumferential direction.

16. The damper device according to claim 11, wherein the second elastic body is disposed so as to at least partially overlap with the elastic body when viewed in a radial direction of the damper device.

17. The damper device according to claim 16, wherein the elastic body is a coil spring, and the second elastic body is disposed inside the elastic body coaxially with the elastic body.

18. The damper device according to claim 8, wherein the damper device is a dry damper.

19. The damper device according to claim 8, wherein a clutch is disposed between the damper device and the electric motor, and between the electric motor and the transmission.

20. The damper device according to claim 8, wherein a moment of inertia of the mass body, a moment of inertia of the plurality of pinion gears, and a gear ratio of the planetary gear mechanism are set such that a moment of inertia distributed to the output element by the planetary gear mechanism is a negative value.

\* \* \* \* \*